(12) United States Patent
Ptasinski

(10) Patent No.: US 7,558,388 B2
(45) Date of Patent: Jul. 7, 2009

(54) DERIVATION METHOD FOR CACHED KEYS IN WIRELESS COMMUNICATION SYSTEM

(75) Inventor: Henry S. Ptasinski, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 752 days.

(21) Appl. No.: 10/966,276

(22) Filed: Oct. 15, 2004

(65) Prior Publication Data

US 2006/0083377 A1    Apr. 20, 2006

(51) Int. Cl.
    *H04K 1/00*    (2006.01)
(52) U.S. Cl. .................................... 380/270
(58) Field of Classification Search .............. 380/270
    See application file for complete search history.

(56) References Cited

U.S. PATENT DOCUMENTS

| | | | | |
|---|---|---|---|---|
| 7,236,477 B2* | 6/2007 | Emeott et al. | ............... | 370/331 |
| 2002/0114303 A1* | 8/2002 | Crosbie et al. | ............... | 370/338 |
| 2004/0103282 A1* | 5/2004 | Meier et al. | .................. | 713/171 |
| 2004/0105414 A1* | 6/2004 | Narayanan et al. | .......... | 370/338 |
| 2004/0185845 A1* | 9/2004 | Abhishek et al. | .......... | 455/422.1 |
| 2004/0242228 A1* | 12/2004 | Lee et al. | .................. | 455/432.1 |
| 2005/0243769 A1* | 11/2005 | Walker et al. | ............... | 370/331 |
| 2005/0254653 A1* | 11/2005 | Potashnik et al. | ........... | 380/270 |
| 2006/0067272 A1* | 3/2006 | Wang et al. | .................. | 370/331 |

* cited by examiner

*Primary Examiner*—Nasser G Moazzami
*Assistant Examiner*—Michael S McNally
(74) *Attorney, Agent, or Firm*—Garlick Harrison & Markison

(57) ABSTRACT

A method and apparatus for providing improved security and improved roaming transition times in wireless networks. In the present invention, the same pairwise master key (PMK) from an authentication server can be used across multiple access points and a new pairwise transition key (PTK) is derived for each association of a station to any of the access points. A plurality of access points are organized in functional hierarchical levels and are operable to advertise an indicator of the PMK cache depth supported by a group of access points (N) and an ordered list of the identifiers for the derivation path. Access points in each level in the cache hierarchy compute the derived pairwise master keys (DPMKs) for devices in the next lower level in the hierarchy and then deliver the DPMKs to those devices. An access point calculates the PTK as part of the security exchange process when the station wishes to associate to the access point. The station also computes the PTK as part of the security exchange process. The station calculates all the DMPKs in the hierarchy as part of computing the PTK. The method and apparatus of the present invention allows the cache depth to vary per station, but it remains constant for a given station within a key circle.

21 Claims, 8 Drawing Sheets

DERIVATION METHOD FOR CACHED KEYS IN WIRELESS COMMUNICATION SYSTEM

BACKGROUND OF THE INVENTION

1. Field of the Invention

The present invention is directed in general to wireless communication systems. In one aspect, the present invention relates to a method and system for managing cached keys for controlling security in a wireless communication device.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth (BT), advanced mobile phone services (AMPS), digital AMPS, global system for mobile communications (GSM), code division multiple access (CDMA), local multi-point distribution systems (LMDS), multi-channel-multi-point distribution systems (MMDS) and/or variations thereof.

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network, via the Internet, and/or via some other wide area network.

Wireless networks based on the IEEE 802.11a, 802.11b, and 802.11g standards have become increasingly popular in homes, small offices, and public spaces such as airports and hotels because they eliminate the need for stringing cable. But concerns have been raised with regard to security shortcomings in those standards that may make them vulnerable to hackers located within range of these networks. A revised standard, referred to as IEEE 802.11i, provides improved security by implementing a security protocol called Robust Security Network, that includes improved key management and encryption/decryption protocols.

One of the difficulties encountered in wireless networking relates to maintaining connectivity between access points and a mobile station that is roaming within a wireless network. As the mobile device roams, it is necessary to abandon its connection with one access point and to establish a new connection with another access point. During the transition in the connection with the various access points, there can be a brief loss of connectivity that may result in the loss of data packets. In many cases, the packet loss will be noticeable to a user, especially when the user is running a real-time application. For some applications, such as TCP, the loss of even a single packet can result in a visible delay with a duration that far exceeds the actual connectivity gap between the wireless device and the various access points. The potential for data loss is exacerbated by a complicated authentication protocol that meets the enhanced security requirements of the 802.11i standard, while enabling a mobile station to change its connections to various access points while roaming within a wireless network.

Devices communicating in a wireless network utilize various security keys, such as the pairwise master key (PMK) defined in the IEEE 802.11i protocol. The current 802.11i protocol, however, only allows each PMK to be used at a single access point. When a station roams to a new access point, a new PMK must be obtained by the access point from the authentication-authorization-accounting (AAA) server, possibly incurring a long interruption of data flow during the roam.

The 802.11i protocol allows for the PMK to be cached by both the authenticator and supplicant, and for the PMK to be reused when a station reassociates to an access point for which the appropriate PMK is cached. This eliminates the need for a credential exchange which may take a long time (seconds or longer) to complete. The 802.11i protocol also provides a "pre-authentication" mechanism for a supplicant to exchange credentials and generate a PMK with an authenticator that is managing a different access point than the one to which the station is currently associated. This PMK can then be used as a cached PMK when the station eventually roams to the new access point. In all cases, a new PTK must be computed per association, requiring the exchange of nonce values. The PMK caching and pre-authentication mechanisms help reduce the time required to complete the security initialization when a station roams between access points, but are limited in the architectures that they can support.

Pre-authentication assumes that an authenticator is addressable using the basic service set ID (BSSID) of the access point as if it were the MAC address (layer 2 address) of the authenticator. While this is often true of groups of access points that are connected e.g., by a switched ethernet, access points within a given administrative domain may actually reside on separate networks that cannot be reached by layer 2 addressing. Additionally, the MAC address used by the authenticator may not be identical to the BSSID of the access point, which is a situation that the pre-authentication mechanism cannot accommodate.

PMK caching does not provide for architectures where the access point and authenticator are not necessarily housed in a single unit, especially when the authenticator may manage more than one access point (a "switch architecture"). The authenticator in such an architecture could use the same PMK across multiple access points, and derive a new PTK for each association of the station to any of the access points. There is no mechanism for the authenticator to communicate its intent to do this to the supplicant, and as a result "opportunistic" key caching approaches have been devised in which the supplicant attempts to reuse PMKs across associations to different access points.

Current proposals for improving roaming times in 802.11 networks have suggested modifying the key hierarchy to better accommodate switch architectures, and address some of the limitations of pre-authentication. The modification involves inserting additional derivation steps between the PMK and PTK, such that the PMK itself is never exposed beyond the original three parties that have access to it.

The first proposed modification comprises three different PMK derivatives (DPMKs) depending on the architecture in question, and allows for two additional levels of caching (first- and second-level DPMKs). The PTK is derived from any of the four PMKs, and the station must know the "path" that the derived PMK took in order to apply the appropriate transforms. The groups of authenticators and access points that have access to the PMK or its derivatives are referred to as key circles (KCs), and the path info is announced in information elements (IEs) as the Master Key Circle ID (MKCID) and the Related Key Circle ID (RKCID). This hierarchy presents security flaws, since the top level PMK can be used both to derive subordinate PMKs and to derive PTKs directly. Also, the station uses different inputs (fixed strings) to the derived PMK transforms depending on the path. However, the workload on the station is variable depending on the number of levels of derivation, so some cases would require less computation.

A proposed method for improving correcting this deficiency allows for a single PMK to be used across multiple access points, but only allows exactly two levels of separation between the AAA client and the access point. The AAA client receives the PMK from the AAA server, and then generates a derived pairwise master key (DPMK) for each controller for which it provides keys. The controller then generates a derived access point PMK (DA-PMK) for each access point for which it provides keys. These two levels (AAA client, controller) may not exist as separate hardware devices, but may be logical entities within an access point.

A second proposed modification that attempts to address the security issues discussed above and that also provides greater architectural symmetry is based on a key hierarchy which uses one final derived PMK from which the PTK is computed. The DPMK always goes through two levels of derivation, regardless of the system architecture (e.g., even if it is a controllerless/switchless network with "fat" access points that house the authenticator and AAA client functions). This approach eliminates the security concerns since the PMK/DPMK at each level is used only for one subordinate function—either to derive a lower level PMK or to derive a PTK, but not both. However, this approach requires that all implementations must always compute two levels of derivation. An additional issue with the proposed architecture is the implicit assumption that there is one controller per AAA client. The KCID is nominally the identifier for the controller, and is used as such in the derivation of the DPMK. However, the original KCID provided in the station's initial authentication message is used to identify the AAA client that holds the original PMK.

In view of the foregoing, there is a need for an improved method and apparatus for caching authentication codes used to establish data connections with stations roaming in wireless communication systems.

SUMMARY OF THE INVENTION

The method and apparatus of the present invention provides improved security and roaming times in wireless networks. In an embodiment of the invention, the same PMK can be used across multiple access points and a new PTK is derived for each association of the station to any of the access points. In the present invention a plurality of access points are operable to advertise an indicator of the cache depth supported by a group of access points (N) and an ordered list of the IDs for the derivation path. For any particular configuration of network devices the cache depth is fixed at a constant value N, regardless of the exact location of a given access point/4-way authenticator device within the hierarchy. This maintains the security, since no PMK is used for more than one purpose, but allows any given configuration to optimize the amount of computation required to do the derivations as appropriate for that configuration. Each level in the cache hierarchy computes the DPMKs for devices in the next lower level in the hierarchy and then delivers the DPMKs to those devices either when requested by such devices, or using some mechanism to proactively deliver DMPKs to those lower level devices. The access point calculates the PTK as part of the security exchange process when the station wishes to associate to the access point. The station also computes the PTK as part of the security exchange process. The station calculates all the DMPKs in the hierarchy as part of computing the PTK.

In various embodiments of the invention, each access point advertises the number of cache levels (N) and the list of KLIDs in an information element (IE) in the appropriate management frames as needed to allow the station to discover the information that it needs in order to compute the PTK from the PMK. The advertisement will typically be in beacons and probe responses, and may be included in other management frames.

The method and apparatus of the present invention allows the cache depth to vary per station, but it remains constant for a given station within a key circle. Instead of advertising a fixed cache depth and list of IDs (e.g., in the beacons and probe responses), the advertisement would indicate that the list is variable, and a station-specific list would be delivered to the station upon demand, for example via a probe response or an action frame.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and apparatus is described herein for improved authentication in a wireless communication system. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated or otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
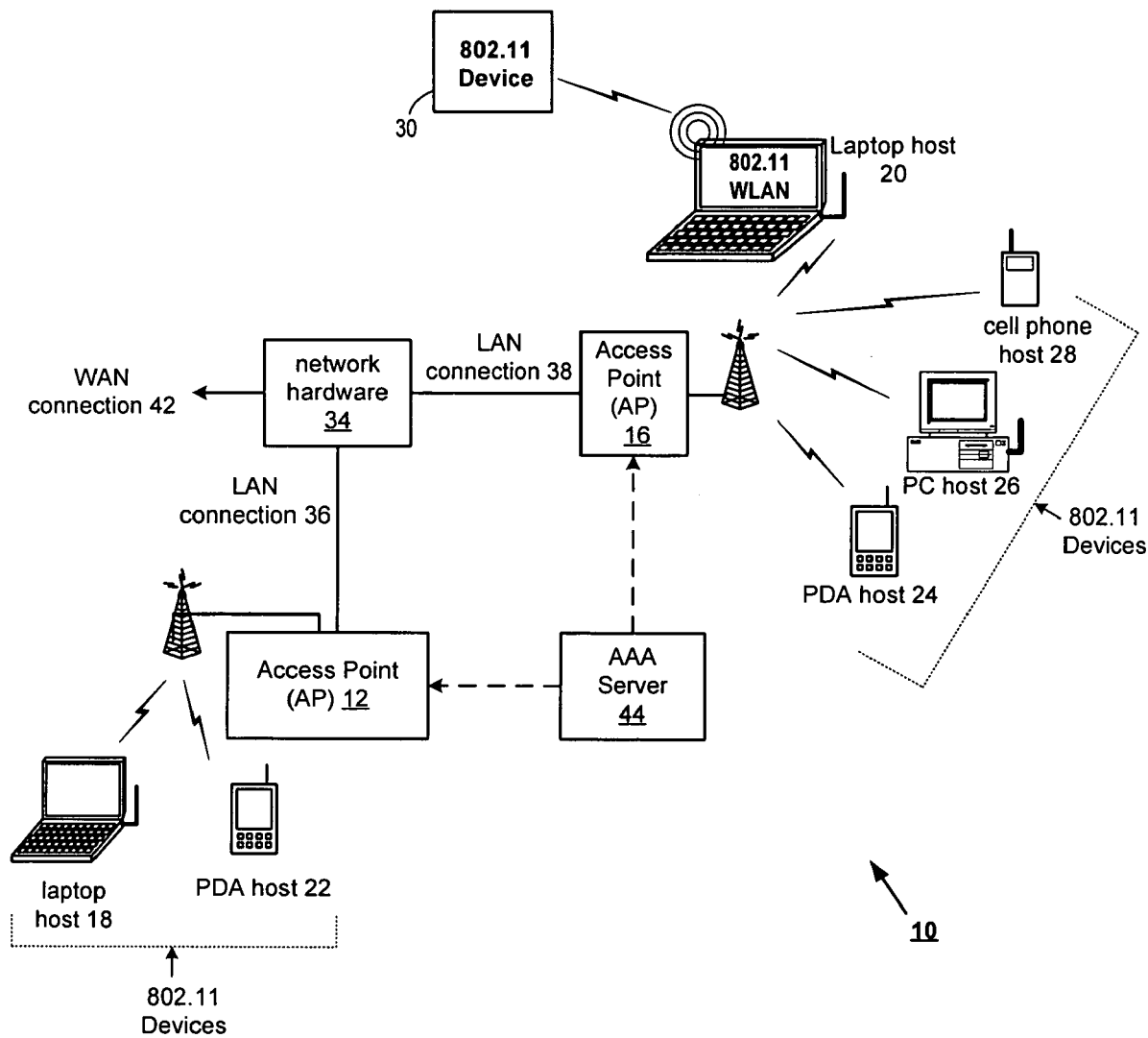
FIG. 1 is a schematic block diagram of a wireless communication system in accordance with the present invention.

FIG. 1 illustrates a wireless communication system 10 in which embodiments of the present invention may operate. As illustrated, the wireless communication system 10 includes a plurality of access points 12, 16, a plurality of wireless communication devices and a network hardware component 34. The wireless communication devices may be laptop host computers 18 and 20, personal digital assistant hosts 22 and 24, personal computer hosts 26, cellular telephone hosts 28, and 802.11 WLAN devices 30. Authentication-authorization-accounting (AAA) services are provided by AAA server 44 as discussed in greater detail hereinbelow.

As illustrated, the access points 12, 16 are operably coupled to the network hardware 34 via local area network connections 36, 38. The network hardware 34 (which may be a router, switch, bridge, modem, system controller, etc.) provides a wide area network connection 42 for the communication system 10. Each of the base stations or access points 12, 16 has an associated antenna or antenna array to communicate with the wireless communication devices in its area. Typically, the wireless communication devices register with a particular base station or access point 12, 16 to receive services from the communication system 10. For direct connections (i.e., point-to-point communications), wireless communication devices communicate directly via an allocated channel. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

The IEEE 802.11i protocol defines a security model for wireless networking wherein an authenticator and a supplicant are responsible for controlling the flow of data traffic between a station, which may be any of the wirelessly enabled devices in FIG. 1 as discussed above. The AAA server 44 is responsible for validating the security credentials provided by the supplicant or by the person using the station which is managed by the supplicant. In general, the supplicant is instantiated on the station which it is managing, and the authenticator is instantiated on the access point which it is managing.

When a station initiates a connection ("associates") with an access point, the AAA server and supplicant exchange credentials, with the authenticator acting as an intermediary. The authenticator forwards the supplicant's credentials to the AAA server 44 for approval. If the AAA server 44 approves the supplicant's credentials, the AAA server 44 sends an indication of approval to the authenticator along with a master key (MK) which is generated as a result of the credential exchange. The supplicant has a copy of the MK, also as a result of the credential exchange. The MK should be unique per credential exchange.

The MK is truncated to 256 bits to generate the Pairwise Master Key (PMK). The PMK, along with the addresses of the access point and station and other data exchanged after association, is used to generate the pairwise transient key (PTK):

PTK<-PRF(PMK, "Pairwise key expansion", Min (AA,SPA)||Max(AA, SPA)||Min(ANonce, SNonce)||Max(ANonce, SNonce), X)

where X is a length which is dependent on the specific cryptographic protocol used to protect the data frames.

A portion of the PTK, the Temporal Key (TK) is used to encrypt, decrypt, and authenticate the data frames exchanged between the station and access point.

The overall IEEE802.11i key hierarchy is thus:

MK->PMK->PTK->TK

As was discussed above, prior attempts to provide enhanced security and improved roaming properties in wireless networks have a number of shortcomings, including the inefficiency of calculating a predetermined number of DPMKs regardless of the cache depth of a particular architecture.

In an embodiment of the invention, the same PMK can be used across multiple access points and a new PTK is derived for each association of the station to any of the access points. In the present invention a plurality of access points are operable to advertise an indicator of the cache depth (N) supported by a group of access points and an ordered list of the IDs for the derivation path (KLID[0] ... KLID[N]). The calculation of the derived PTK is then:

---

Define
N = Total number of cache/intermediate levels.
    In traditional 'fat' access point scenario, N = 0.
KLID[n] = Key Level ID for level n
KLID[0] = KCID (e.g. AAA Client ID)
KLID[N] = BSSID
DPMKSTR[0] = "DPMK-0"
DPMKSTR[1] = "DPMK-1"
etc
    then
DPMK[0] = PMK (received by AAA client from AAA server)
DPMK[n] = f1(DPMK[n−1], DPMKSTR[n], KLID[n]), 0<n<=N
PTK = f2(DPMK[N])
where f1( ) and f2( ) key generation functions that output key material of the required length. A specific example of functions which can be used is:
f1(DPMK[n−1], DPMKSTR[n], KLID[n]) =
    PRF(DPMK[n−1], DPMKSTR[n], SPA || KLID[n], 256)
f2(DPMK[N]) =
    PRF(PMK, "Pairwise key expansion", Min(AA,SPA) || Max(AA, SPA) || Min(ANonce, SNonce) || Max(ANonce, SNonce), X)
    where X = length in bits of the required PTK
    PRF( ) is defined in IEEE 802.11i.

For any particular configuration of network devices using this invention, the cache depth is fixed at a constant value N, regardless of the exact location of a given access point/4-way authenticator device within the hierarchy. This maintains the security properties which the second proposed version addressed, i.e., no PMK is used for more than one purpose, but allows any given configuration to optimize the amount of computation required to do the derivations as appropriate for that configuration. When using only one level of caching (the PMK itself), the key hierarchy of the present invention is identical to that of IEEE 802.11i. However, the method and apparatus of the present invention also allows for more levels of caching if desired for a given system architecture.

Each level in the cache hierarchy computes the DPMKs for devices in the next lower level in the hierarchy and then delivers the DPMKs to those devices either when requested by such devices, or using some mechanism to proactively deliver DMPKs to those lower level devices. The access point calculates the PTK as part of the security exchange process when the station wishes to associate to the access point. The station also computes the PTK as part of the security exchange process. The station calculates all the DMPKs in the hierarchy as part of computing the PTK.

Each access point advertises the number of cache levels (N) and the list of KLIDs in an information element (IE) in the appropriate management frames as needed to allow the station to discover the information that it needs in order to compute the PTK from the PMK. The advertisement will typically be in beacons and probe responses, and may be included in other management frames.

The method and apparatus of the present invention allows the cache depth to vary per station, but it remains constant for a given station within a key circle. Instead of advertising a fixed cache depth and list of IDs (e.g., in the beacons and probe responses), the advertisement would indicate that the list is variable, and a station-specific list would be delivered to the station upon demand, for example via a probe response or an action frame.

Figure 2:
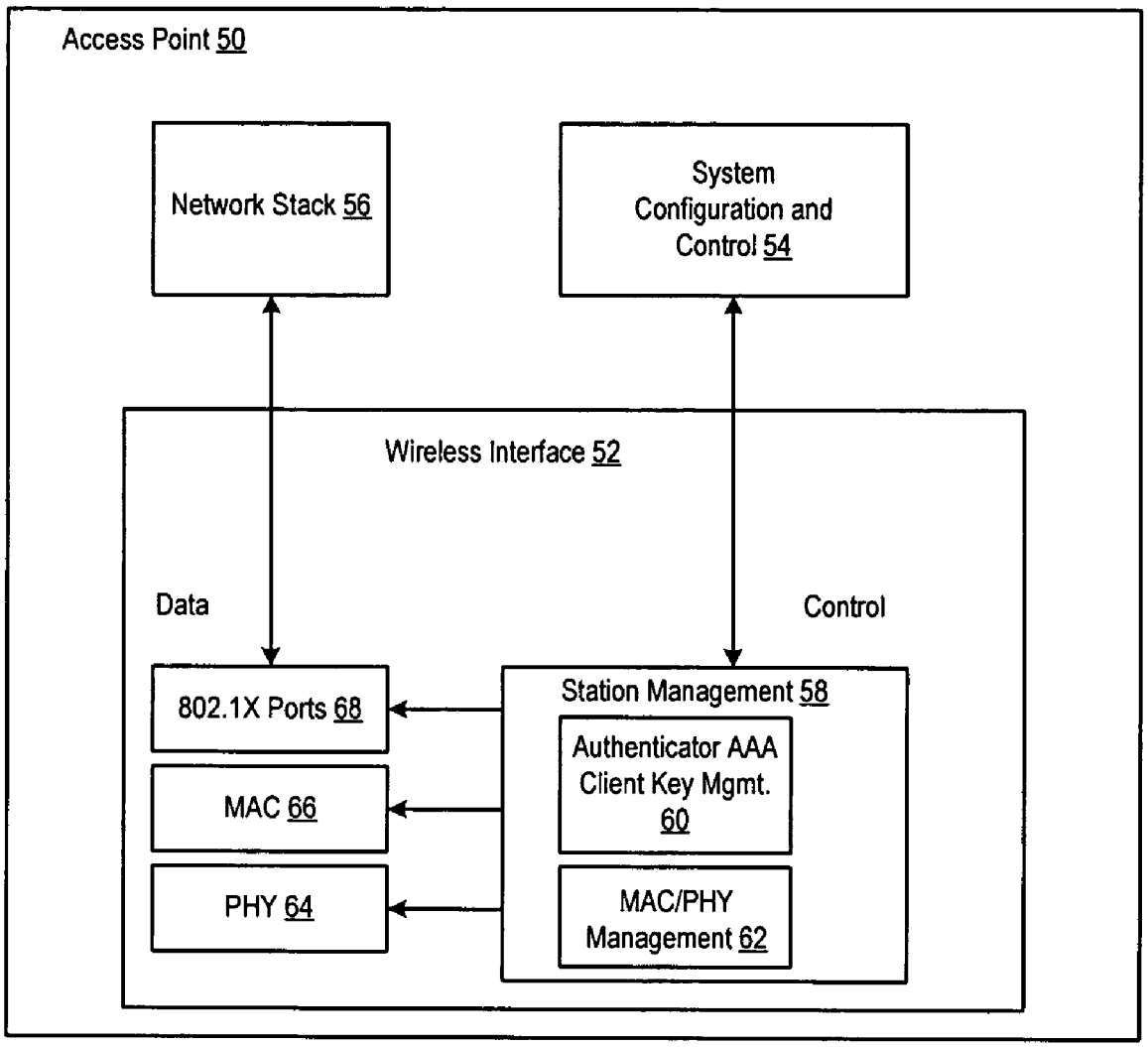
FIG. 2 is a block diagram of the functional components of an access point.

FIG. 2 is a block diagram of the functional components of an access point 50 that is broadly comprised of a wireless interface 52, a system configuration and control module 54 and a network stack 56. Control signals from the system configuration and control module 54 are provided to station management module 58, comprising an authenticator/AAA client/key management module 60 and a media access control MAC/PHY management module 62. The PHY layer 64 and the MAC layer 66 are controlled by the station management module 58 to facilitate transfer of data. In addition, a port control module 68, that is compliant with the 802.1X specification, controls operations of ports in accordance with operation of the AAA client. As will be understood by those of skill in the art, the authenticator/AAA client/key management module 60 implements the AAA client functions, including authentication and key management functions, as will be described in greater detail hereinbelow.

Figure 3:
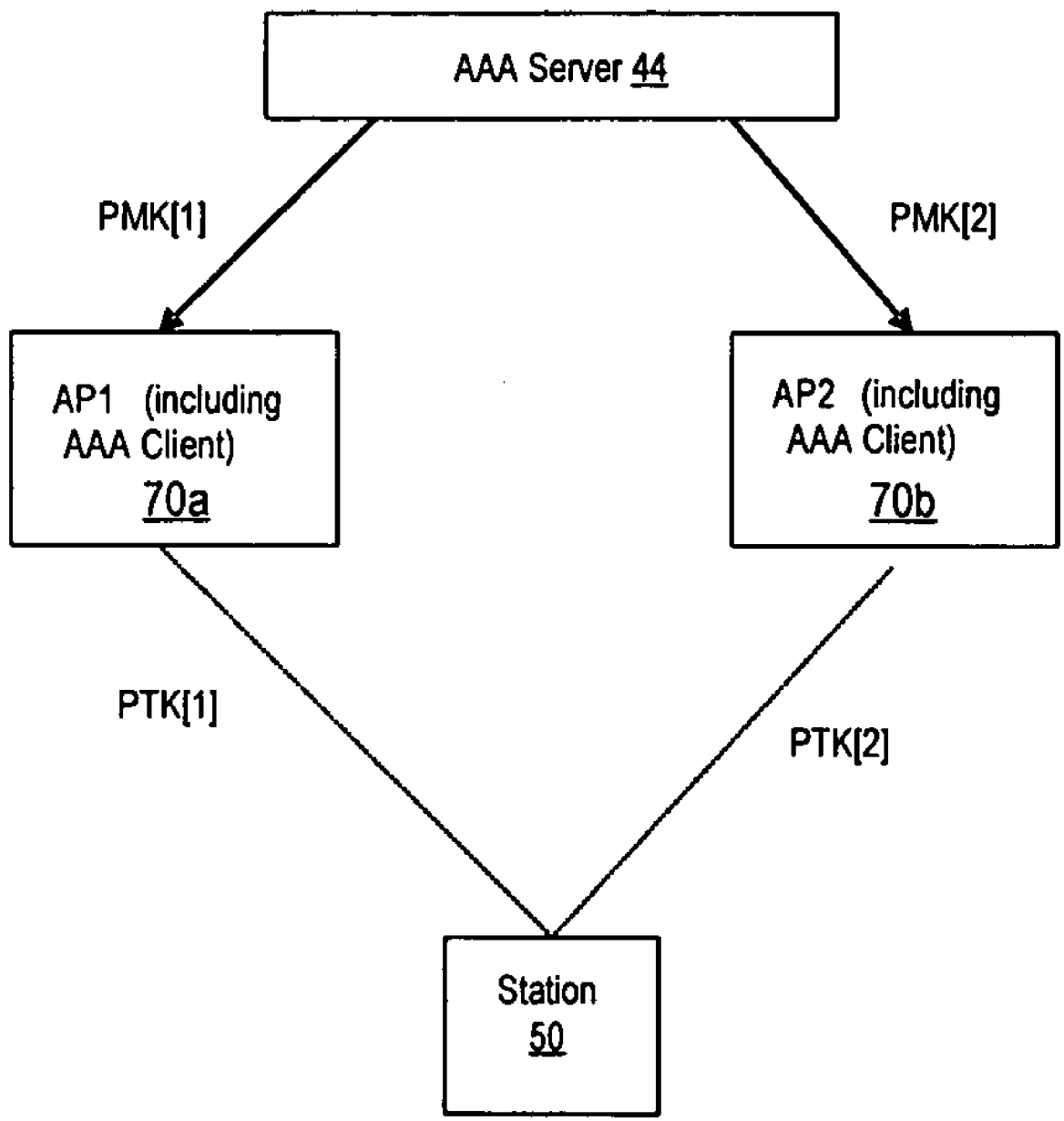
FIG. 3 is an illustration of an architecture for an 802.11 wireless communication system that allows for the use of each PMK by a single access point with an integrated authentication-authorization-accounting (AAA) client.

FIG. 3 is an illustration of an 802.11i authentication architecture for providing authentication functions for a station 50 that is operating in a wireless environment in accordance with the 802.11i standard. In the architecture shown in FIG. 3, each of the access points 70a and 70b receive individual pairwise master keys (PMKs), designated as PMK[1] and PMK[2], respectively, for use in deriving pairwise transient keys (PTKs) with the station. The access points 70a and 70b each generate pairwise transient keys PTK[1] and PTK[2], respectively, for use in protecting data frames transmitted to and from the station, and for protecting some additional management traffic transmitted to and from the station.

In operation, the station 50 and the AAA server 44 negotiate the generation of pairwise master keys for transmission to and from the station 50. The pairwise master keys, PMK[1] and PMK[2] are transferred to access points 70a and 70b. A copy of the respective PMKs are also stored in the station. A subsequent handshake operation between the various access points and the station results in the mutual generation of the PTKs by the access points and the station. For example, the handshake negotiation between access point 70a and station 50 will result in generation of PTK[1]. As will be understood by those of skill in the art, the PTK contains key portions that are used to encrypt and decrypt data packets exchanged with the station 50.

As the station 50 roams to a new access point, e.g., access point 70b, the station attempts to associate with the access point and there is, again, an exchange with the AAA server 44 to generate PMK[2]. As will be understood by those of skill in the art, PMK[2] is distinct from PMK[1] that was generated during the association between station 50 and access point 70a. The PMK[2] is sent to access point 70b and a copy of PMK[2] is also stored in the station 50. The station 50 and access point 70b again enter into a handshake protocol to generate PTK[2]. The PTK[2] is, then, unique to the association between station 50 and access point 70b. Upon completion of the association with access point 70b, the station is disassociated with access point 70a.

Figure 4:
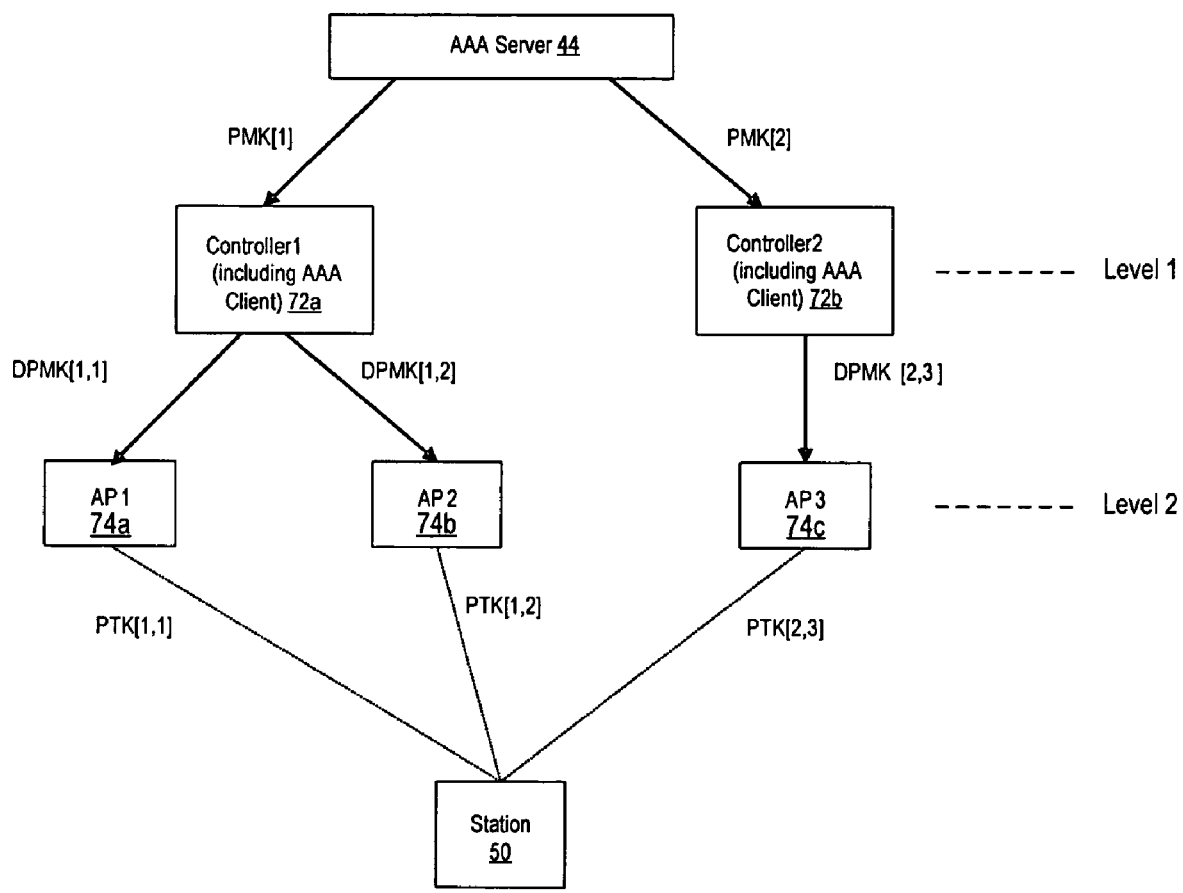
FIG. 4 is an illustration of an improved PMK cache authentication architecture for a two level system, where the AAA client is implemented in a separate device from the access points.

FIG. 4 is an illustration of an 802.11i architecture in accordance with the present invention wherein a two level system is implemented with a plurality of controllers and a plurality of access points. The first level comprises controllers 72a and 72b, with each of the controllers comprising a AAA client therein. The second level of the illustrative embodiment shown in FIG. 4 comprises three access points, 74a, 74b, and 74c, although those of skill in the art will appreciate that a larger number of access points can be included within the second level within the scope of the present invention. In the two level system, the AAA client functionality of the authenticator/AAA client/key management module 60 is implemented in the controllers 72a and 72b instead of in the individual access points 74a, 74b, and 74c. The access points 74a, 74b, and 74c implement the 802.11 radio interface and generate the PTKs with the station 50. The remaining functionality represented in FIG. 1 is divided between the controllers and the access points. As will be appreciated by those of skill in the art, the actual partitioning of the functionality may be implemented in various ways that do not depart from the spirit and scope of the invention. When station 50 attempts to associate with one of the access points, an 802.1X negotiation is initiated with AAA server 44 that results in the generation of PMKs. For example, if station 50 attempts to associate with access point 74a, the 802.1X negotiation with AAA server 44 will result in generation of PMK[1]. The PMK[1] will be provided to controller 72a and a copy of PMK[1] will also be stored in station 50. The AAA client in controller 72a is used to generate a derived pairwise master key (DPMK) which is designated as DPMK[1,1], indicating that the DPMK is derived from PMK[1] and is directed to access point 74a (access point 1). The access point 74a uses the DPMK[1,1] to generate a pairwise transient key PTK[1,1] to complete the 802.11 association between the station 50 and the access point 74a. The station 50 is operable to generate a corresponding DPMK[1,1] that is stored within the station 50. Likewise, the station 50 is operable to calculate the corresponding PTK[1,1] as part of the overall 802.11i authentication process. Once the station 50 and the access point 74a have the same DPMK[1,1], they can complete the negotiation to generate PTK[1,1].

If the station 50 is roaming within the wireless network and attempts to associate with access point 74b, the station will still have a stored value for PMK[1] that was generated during the initiation of the 802.1X negotiation with the AAA server 44. The station 50 is operable to inform access point 74b that it has a stored value for PMK[1] and the source from which the PMK[1] was obtained. Access point 74b is operable to contact controller 72a to request a DPMK. Controller 72 then uses PMK[1] to generate DPMK[1,2] that is used by access point 74b to generate PTK[1,2], thereby completing the 802.11i authentication. In some embodiments of the invention, the wireless network system is operable to anticipate the roaming direction of the station 50. In this embodiment, controller 72a is operable to generate DPMK[1,2] in advance, thereby decreasing the latency associated with the 802.11i authentication. As will be appreciated by those of skill in the art, the embodiment of the invention illustrated in FIG. 4 comprises a single level of indirection between each of the access points in level 2 with the corresponding controller in level 1.

Figure 5:
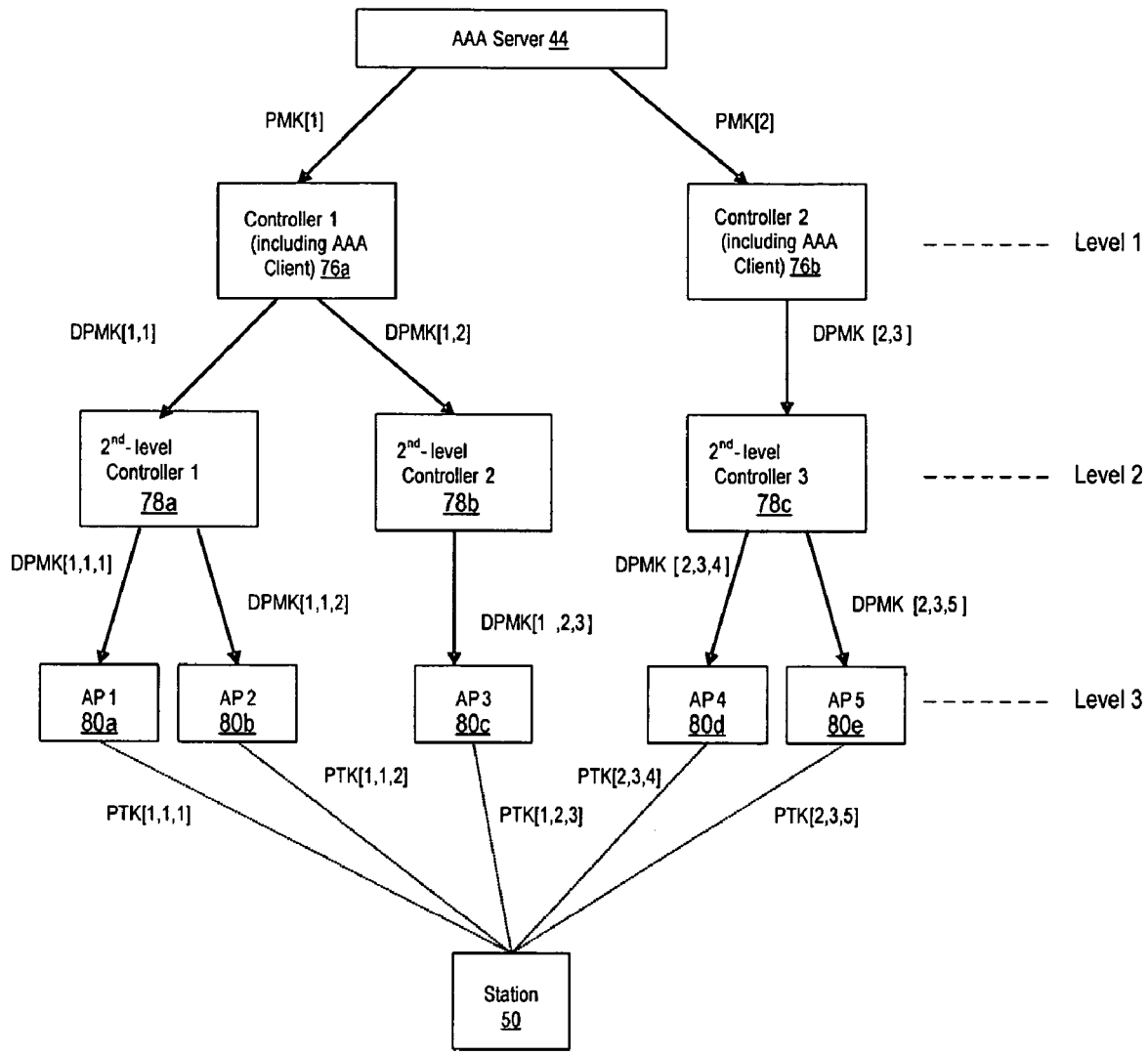
FIG. 5 is an illustration of a three-level authentication architecture.

FIG. 5 is an illustration of an 802.11i architecture in accordance with the present invention wherein three levels are implemented with a plurality of controllers and a plurality of access points. The first level comprises controllers 76a and 76b, with each of the controllers 76a and 76b comprising a AAA client. The second level comprises controllers 78a, 78b, and 78c. Finally, level three comprises five access points 88a-e. As will be appreciated by those of skill in the art, the number of controllers and access points illustrated in the various levels are for discussion purposes only, and additional controllers or access points could be added within the scope of the present invention. In multi-level systems, the AAA client functionality of the authenticator/AAA client/key management module 60 is implemented in the controllers 76a and 76b. The access points 80a, 80b, 80c, 80d, and 80e implement the 802.11 radio interface and generates the PTK with the station 50. The remaining functionality represented in FIG. 1 is divided between the controllers and the access points. As will be appreciated by those of skill in the art, the actual partitioning of the functionality may be implemented in various ways that do not depart from the spirit and scope of the invention. When station 50 attempts to associate with one of the access points, an 802.1X negotiation is initiated with AAA server 44 that results in a generation of PMKs. For example, if station 50 attempts to associate with access point 80a, the 802.1X negotiation with the AAA server 44 will result in the generation of PMK[1]. The PMK[1] will be provided to controller 76a and a copy of PMK[1] will also be stored in station 50. The AAA client and controller 76a is used to generate a DMPK, which is designated as DPMK[1,1]. The second level controller uses the DPMK[1,1] to generate DMPK[1,1,1] that is transferred to access point 80a. The access point 80a uses DPMK[1,1,1] to generate PTK[1,1,1] as part of the overall 802.11i authentication process. Once the station 50 and the access point 80a have the same DPMK[1,1,1], they can complete the negotiation to generate PTK[1,1,1], thereby completing the 802.11i authentication process.

If the station 50 is roaming within the wireless network and attempts to associate with access point 80b, the station will have a stored value for DPMK[1,1] that was generated during the initiation of the 802.1X negotiation with the AAA server 44. The station 50 is operable to inform access point 80b that it has a stored value for DPMK[1,1] and the source (controller 78a) from which the DPMK[1,1] was obtained. Access point 80b is operable to contact controller 78a to request a DPMK. Controller 78a then uses DPMK[1,1] to generate DPMK[1,1,2] that is used by access point 80b to generate PTMK[1,1,2], thereby completing the 802.11i authentication. As was discussed above in connection with other embodiments of the invention, the wireless system is operable to anticipate the roaming direction of the station 50. In this embodiment, controller 78a is operable to generate DPMK[1,1,2] in advance, thereby decreasing the latency associated with the 802.11i authentication.

In another embodiment of the present invention, the station may obtain multiple PMKs after completing multiple exchanges with the AAA server. In such instances, the station, upon roaming to a new access point, may present multiple pathlists to the new access point, each pathlist including an indication to which PMK said pathlist is applicable. For example, station 50 in FIG. 5 may have, after associating to access point 80a and access point 80e, two PMKs (PMK[1] and PMK[2]) and associated pathlists. Upon roaming to access point 80b, the station 50 will provide both pathlists to access point 80b. Access point 80b, recognizing the address of second level controller 78a in the pathlist for PMK[1], will attempt to fetch DPMK[1,1,2] from second level controller 78a.

Figure 6:
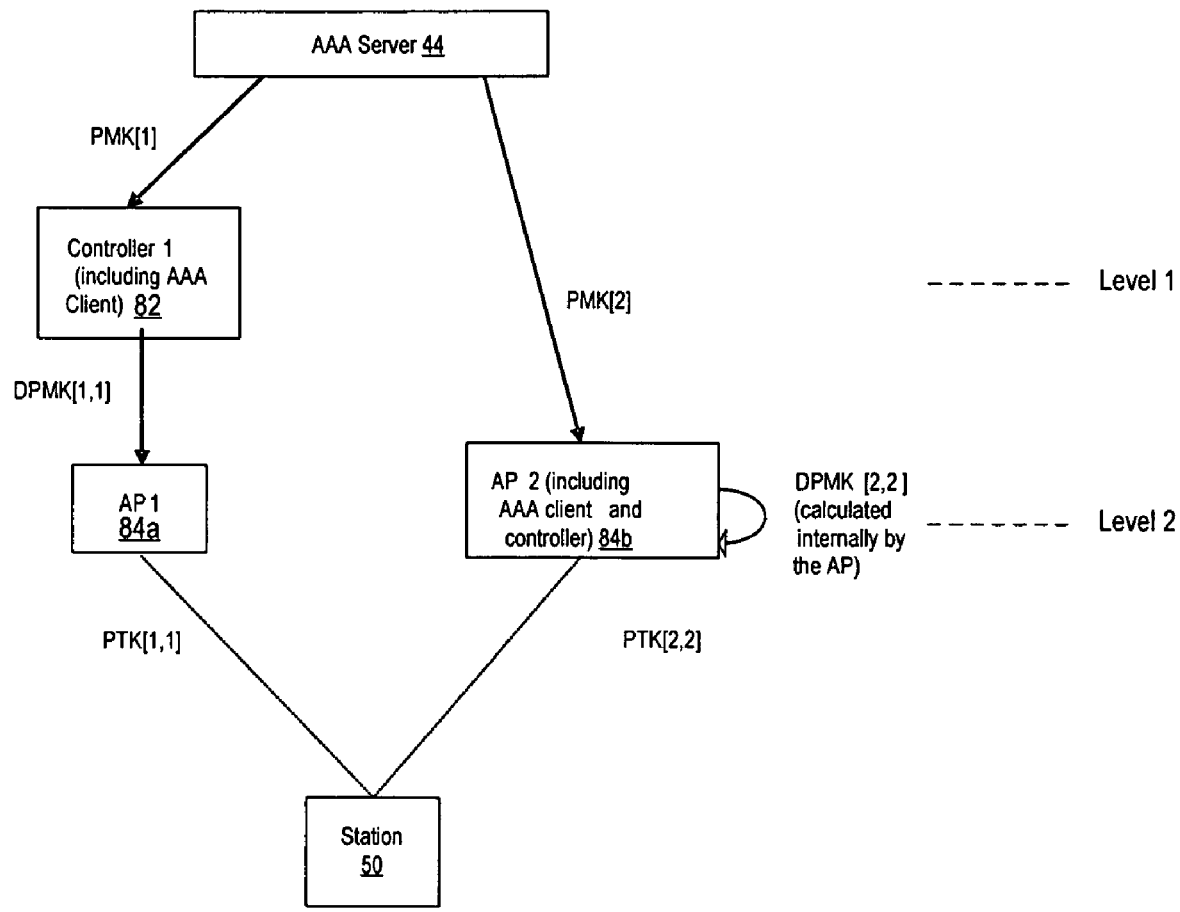
FIG. 6 is an illustration of an architecture for using a cached PMK in a mixed authentication architecture.

FIG. 6 is an illustration of an embodiment of the improved PMK cache mixed authentication architecture in accordance with the present invention. The system illustrated in FIG. 6 comprises two levels, with the first level comprising a controller 82 that includes the AAA client. The second level comprises first and second access points 84a and 84b. As shown in FIG. 6, access point 84b comprises an integrated AAA client and controller. In this embodiment of the invention, an attempt by station 50 to associate with access point 84a will result in calculations of PMK[1], DMPK[1,1], and PTK[1,1] as discussed hereinabove with previous embodiments. In the embodiment of FIG. 6, however, the attempt by station 50 to associate with access point 84b will result in AAA server 44 generating PMK[2] that is used by access point 84b to internally calculate DPMK[2,2]. Access point 84b is also operable to calculate PTK[2,2].

The improved PMK cache approach allows for an arbitrary number of levels between the AAA clients. As shown in FIG. 6, devices of different capability can be mixed in an installation. The final DPMKs used to generate the PTK always come from the same level. Access point 2 internally calculates the DPMK since it internally implements the functions handled by controller 1.

Figure 7:
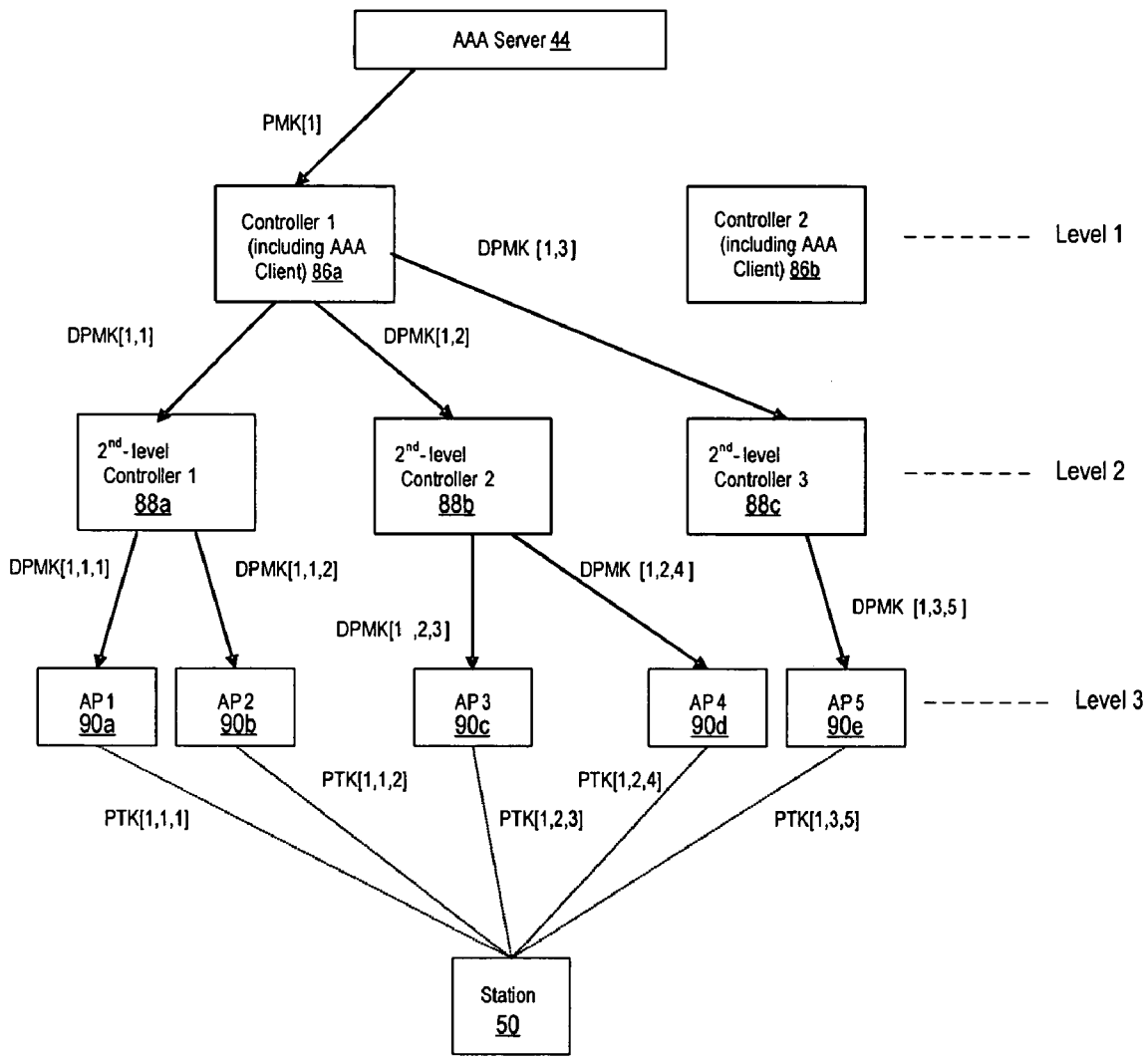
FIG. 7 is an embodiment of the present invention for use in an architecture implementing multi-level key fetching.

FIG. 7 is an embodiment of the present invention for use in a three level architecture implementing multi-level key fetching. The first level comprises controllers 86a-b which include AAA clients. The second level comprises controllers 86a-c. Finally, the third level comprises access points 90a-e. Using multi-level key fetching, when station 50 roams, it sends a pathlist containing the KLIDs for the PMK it intends to use for 802.11i authentication to the new access point. If the new access point recognizes an address in the pathlist for a controller that is one level higher in the key hierarchy, the new access point attempts to fetch the required DPMK from that controller. Otherwise, the access point requests a DPMK from its parent controller, providing the full pathlist as provided by the station 50. This controller then attempts to obtain a DPMK from a controller, one level above it, which is listed in the pathlist provided by the station 50. This process is repeated for each level in the hierarchy until either a DPMK fetch succeeds, or the top of the key hierarchy is reached. For example, if station 50 is roaming from access point 90c to access point 90d in FIG. 7, the station 50 provides a pathlist that includes at least the addresses of second level controller 88b and controller 86a. Access point 90d, recognizing the address of second level controller 88b, attempts to fetch the required DPMK from second level controller 88b. As a further example, if station 50 is roaming from access point 90c to access point 90e, the station 50 provides a pathlist that includes at least the addresses of second level controller 88b and controller 86a. Access point 90e, failing to recognize the address of second level controller 88b for various reasons, will attempt to fetch the required DPMK from second level controller 88c, forwarding the pathlist from station 50 to second level controller 88c. Second level controller 88c, recognizing the address for controller 86a, attempts to fetch the required DPMK from controller 86a. If a DPMK is fetched successfully, the key information is propagated down to the new access point with a DPMK derivation occurring at each step. Continuing the previous example, when second level controller 88c receives the new DMPK[1,3] from controller 86a, second level controller 88c generates DPMK[1,3,5] and delivers this key to access point 90e. The new access point then notifies the station 50 of success, and a handshake to derive the PTK from the DPMK then occurs. If no DPMK is successfully fetched, the access point is notified of the failure, and the access point notifies the station 50 of such failure. As will be understood by those of skill in the art, as a station roams between access points, various DPMKs will be propagated throughout the system. Each component in the hierarchy may choose to cache some or all of these DPMKs for reuse if station roams away, then returns. In that case, a fetch from a higher level device is not required and a success indication is returned by the device that caches the DPMK.

If station 50 has associated with multiple access points, the pathlist for a PMK could become large. In this case, a plurality of methods can be implemented in the invention: a) the station can send only the pathlist that relates to the most recently visited access point, or b) the station can send the complete pathlist that includes information for all access points which it has visited, or c) the station can send an intermediate subset of the pathlist that provides some significant portion of the information that the station has discovered while roaming.

Figure 8:
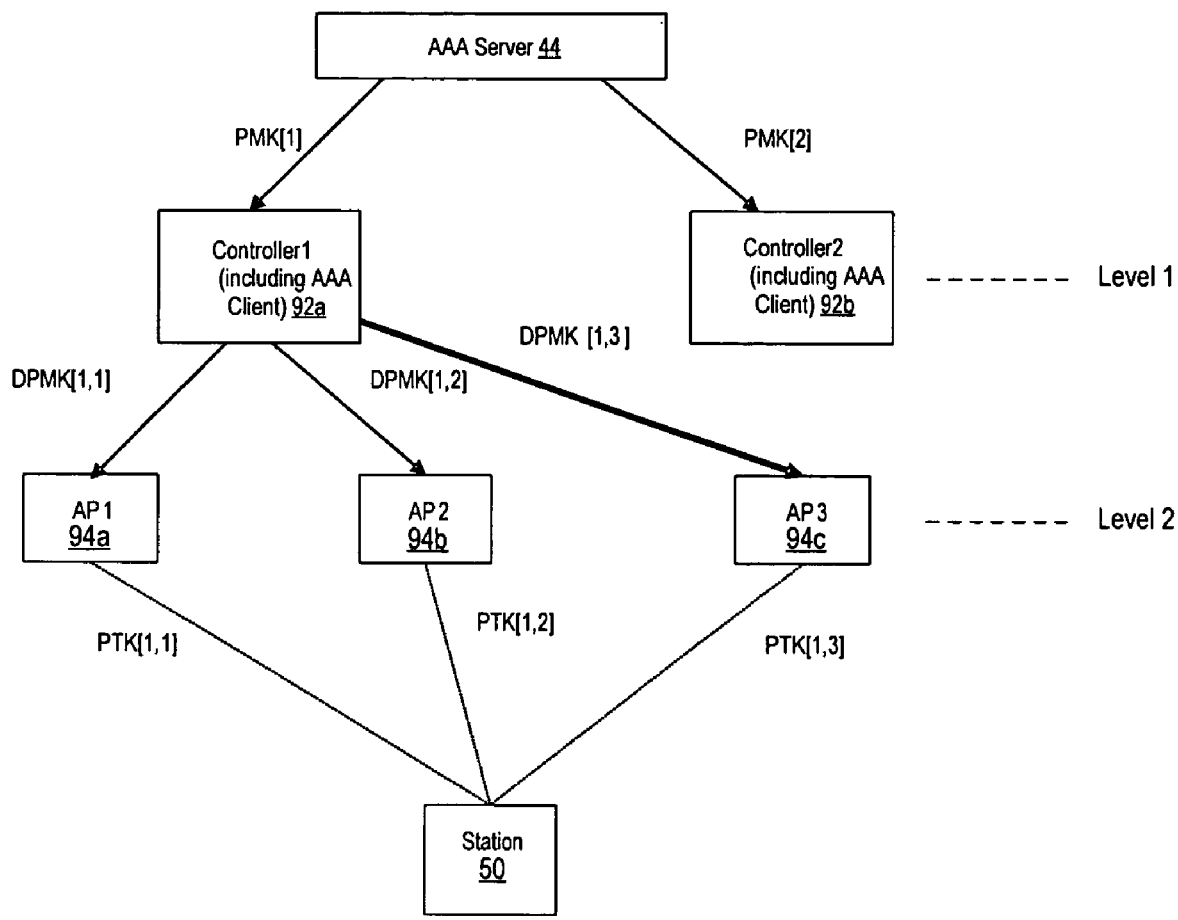
FIG. 8 is another embodiment of the present invention for use in an architecture implementing multi-level key fetching.

FIG. 8 is another embodiment of the present invention for use in a two level architecture implementing multi-level key fetching. The first level comprises controllers 92a-b which include AAA clients. The second level comprises access points 94a-c. Processes implemented in FIG. 8 are substantially similar to those discussed above in connection with FIG. 7, however, the key fetching occurs in a two level system. As discussed above, when station 50 roams, it sends a pathlist for the PMKs it intends to use to the new access point. For example, if station 50 is roaming from access point 94b to access point 94c, and if the access point 94c recognizes the address for controller 92a in the pathlist, the access point 92c will attempt to fetch the required DPMK from controller 92a.

OTHER EMBODIMENTS

Other embodiments are within the following claims.

Although the present invention has been described in detail, it should be understood that various changes, substitutions and alterations can be made hereto without departing from the spirit and scope of the invention as defined by the appended claims.

What is claimed is:

1. A system for communicating information over a wireless network, comprising:
   an authentication server operable to generate a first authentication key;
   a controller operable to receive and store the first authentication key and to generate derived authentication keys therefrom;
   a plurality of access points operable to advertise:
      a cache hierarchy depth (N) supported by the plurality of access points, in which the plurality of access points are hierarchically arranged from the authentication server that is at cache hierarchy depth zero and in which N is greater than one and designates a farthest depth of a hierarchy for the access points;
      a hierarchically ordered list of identifiers for a derivation path for derived authentication keys;
      wherein selected access points are operable to generate transient authentication keys from respective derived authentication keys of N−1 hierarchy level and when a particular access point lacks a hierarchy level to generate a N−1 level derived authentication key, the particular access point is to calculate the N−1 level derived authentication key in order to generate a transient authentication key, so that all transient authentication keys are generated from derived authentication keys of the N−1 hierarchy level; and
   a station operable to associate with selected access points in the plurality of access points and to mutually derive the transient authentication keys therefrom to establish an authenticated connection within the wireless network.

2. The system of claim 1, wherein the first authentication key comprises a pairwise master key.

3. The system of claim 1, wherein the derived authentication keys comprise derived pairwise master keys.

4. The system of claim 1, wherein the transient authentication keys comprise pairwise transient keys.

5. A method for communicating information over a wireless network, comprising:
   initiating an association between a station and a first access point, thereby causing an authentication server to generate a first authentication key;
   storing the first authentication key in a controller and generating derived authentication keys therefrom;
   receiving the derived authentication keys in selected access points in a plurality of access points wherein the plurality of access points are operable to advertise:
      a cache hierarchy depth (N) supported by the plurality of access points, in which the plurality of access points are hierarchically arranged from the authentication server that is at cache hierarchy depth zero and in which N is greater than one and designates a farthest depth of a hierarchy for the access points;
      a hierarchically ordered list of identifiers for a derivation path for derived authentication keys;
      wherein selected access points are operable to generate transient authentication keys for use by a station from respective derived authentication keys of N−1 hierarchy level and when a particular access point lacks a hierarchy level to generate a N−1 level derived authentication key, the particular access point is to calculate the N−1 level derived authentication key in order to generate a transient authentication key, so that all transient authentication keys are generated from derived authentication keys of the N−1 hierarchy level; and
   associating a station with selected access points in the plurality of access points and receiving transient authentication keys therefrom to establish an authenticated connection within the wireless network.

6. The method of claim 5, wherein the first authentication key comprises a pairwise master key.

7. The method of claim 5, wherein the derived authentication keys comprise derived pairwise master keys.

8. The method of claim 5, wherein the transient authentication key comprises a pairwise transient key.

9. A system for communicating information over a wireless network, comprising:
- an authentication server operable to generate a first authentication key;
- a plurality of access points operable to advertise:
  - a cache hierarchy depth (N) supported by the plurality of access points, in which the plurality of access points are hierarchically arranged from the authentication server that is at cache hierarchy depth zero and in which N is greater than one and designates a farthest depth of a hierarchy for the access points; and
  - a hierarchically ordered list of identifiers for a derivation path for derived authentication keys;
  - wherein
    - selected access points are operable to generate transient authentication keys from respective derived authentication keys of N−1 hierarchy level and when a particular access point lacks a hierarchy level to generate a N−1 level derived authentication key, the particular access point is to calculate the N−1 level derived authentication key in order to generate a transient authentication key, so that all transient authentication keys are generated from derived authentication keys of the N−1 hierarchy level; and
- a station operable to associate with selected access points in the plurality of access points and to mutually derive the transient authentication keys therefrom to establish an authenticated connection within the wireless network.

10. The system of claim 9, wherein the system further includes a plurality of controllers operable to generate derived authentication keys.

11. The system of claim 9, wherein the system further includes a plurality of controllers organized at more than one hierarchy level and wherein the controllers in the hierarchy levels are operable to compute derived authentication keys.

12. The system of claim 10, wherein at least one of the access points is at a same hierarchy level as one of the controllers.

13. The system of claim 9, wherein the first authentication key comprises a pairwise master key.

14. The system of claim 9, wherein the derived authentication keys comprise derived pairwise master keys.

15. The system of claim 9, wherein the transient authentication keys comprise pairwise transient keys.

16. A system for communicating information over a wireless network having a plurality of hierarchal functional levels, comprising:
- an authentication server operable to generate a first authentication key, wherein the authentication server is at hierarchy level zero;
- a controller at hierarchy level one, in which the controller is operable to receive and store the first authentication key and to generate derived authentication keys therefrom;
- a plurality of access points operable to advertise:
  - a cache hierarchy depth (N) supported by the plurality of access points, in which the plurality of access points are hierarchically arranged from the authentication server that is at cache hierarchy depth zero and in which N is greater than one and designates a farthest depth of a hierarchy for the access points; and
  - a hierarchically ordered list of identifiers for a derivation path for derived authentication keys;
  - wherein
    - selected access points are operable to generate transient authentication keys from respective derived authentication keys of N−1 hierarchy level and when a particular access point lacks a hierarchy level to generate a N−1 level derived authentication key, the particular access point is to calculate the N−1 level derived authentication key in order to generate a transient authentication key, so that all transient authentication keys are generated from derived authentication keys of the N−1 hierarchy level;
- a station operable to associate with selected access points in the plurality of access points and to mutually derive the transient authentication keys therefrom to establish an authenticated connection within the wireless network.

17. The system of claim 16, wherein at least one of the controllers includes an authenticator.

18. The system of claim 16, wherein the access points are functionally arranged having different tiers in the hierarchy.

19. The system of claim 16, wherein the first authentication key comprises a pairwise master key.

20. The system of claim 16, wherein the derived authentication keys comprise derived pairwise master keys.

21. The system of claim 16, wherein the transient authentication keys comprise pairwise transient keys.

* * * * *